United States Patent
Lu et al.

(10) Patent No.: US 9,356,653 B2
(45) Date of Patent: *May 31, 2016

(54) METHOD AND ARRANGEMENT IN A DSL VECTORING SYSTEM

(71) Applicant: Telefonaktiebolaget L M Ericsson (publ), Stockholm (SE)

(72) Inventors: Chenguang Lu, Sollentuna (SE); Per-Erik Eriksson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,489

(22) Filed: Feb. 10, 2015

(65) Prior Publication Data

US 2015/0155913 A1 Jun. 4, 2015

Related U.S. Application Data

(63) Continuation of application No. 14/181,932, filed on Feb. 17, 2014, now Pat. No. 8,971,392, which is a continuation of application No. 13/581,591, filed as application No. PCT/SE2010/050908 on Aug. 23, 2010, now Pat. No. 8,681,843.

(60) Provisional application No. 61/350,218, filed on Jun. 1, 2010.

(51) Int. Cl.
*H04B 1/38* (2015.01)
*H04L 27/10* (2006.01)
(Continued)

(52) U.S. Cl.
CPC .............. *H04B 3/32* (2013.01); *H04M 11/062* (2013.01); *H04B 3/487* (2015.01); *H04L 27/2601* (2013.01); *H04M 3/18* (2013.01)

(58) Field of Classification Search
CPC .............................. H04B 3/32; H04M 11/062
See application file for complete search history.

(56) References Cited

U.S. PATENT DOCUMENTS 8,073,135 B2 12/2011 Rhee et al.
8,081,704 B2 12/2011 Ginis et al.
(Continued)

FOREIGN PATENT DOCUMENTS

EP 2034622 A1 3/2009
WO 2009148530 A2 12/2009
WO 2011152768 A1 12/2011

OTHER PUBLICATIONS

Alcatel-Lucent, "G.vector: Retrains due to Disorderly Leaving Events," Temporary Document 10HA-020, ITU—Telecommunication Standardization Sector, Study Group 15, Question 4, Huntsville, Alabama, Mar. 22-26, 2010, 4 pages.
(Continued)

*Primary Examiner* — Erin File
(74) *Attorney, Agent, or Firm* — Withrow & Terranova, PLLC

(57) ABSTRACT

Method and arrangement in a Vectoring Control Entity, VCE, for handling disorderly events in a Digital Subscriber Line, DSL, system. The method involves a number of actions, to be performed when a disorderly event occurs on line m in a vectored group of DSL lines, and the transmission on line m is continued. The method comprises obtaining error samples from Customer Premises Equipments, CPEs, connected to other lines in the vectored group of DSL lines. The method further comprises—calculating an estimate of the channel coefficients changed due to the disorderly event, based on the error samples, thus providing a partial channel estimate. Further, the method comprises—modifying a downstream precoder, at least partly based on the partial channel estimate, such that retraining the other lines in the vectored group due to the disorderly event is avoided.
The arrangement is adapted to enable the performance of the above described method.

11 Claims, 8 Drawing Sheets

(51) Int. Cl.
*H04B 3/32* (2006.01)
*H04M 11/06* (2006.01)
*H04L 27/26* (2006.01)
*H04M 3/18* (2006.01)
*H04B 3/487* (2015.01)

(56) References Cited

U.S. PATENT DOCUMENTS

| | | | |
|---|---|---|---|
| 8,300,803 B2* | 10/2012 | Biyani et al. | 379/417 |
| 8,681,843 B2 | 3/2014 | Lu et al. | |
| 8,817,907 B2* | 8/2014 | Sorbara et al. | 375/284 |
| 8,971,392 B2 | 3/2015 | Lu et al. | |
| 2006/0146945 A1 | 7/2006 | Chow et al. | |
| 2010/0278222 A1 | 11/2010 | De Lind Van Wijngaarden et al. | |
| 2010/0329386 A1* | 12/2010 | De Lind Van Wijngaarden | 375/296 |
| 2011/0007623 A1* | 1/2011 | Cendrillon et al. | 370/201 |
| 2011/0286503 A1* | 11/2011 | Cioffi et al. | 375/220 |
| 2012/0243424 A1 | 9/2012 | Wang | |
| 2012/0257691 A1* | 10/2012 | Ginis et al. | 375/296 |

OTHER PUBLICATIONS

Author Unknown, "Self-FEXT cancellation (vectoring) for use with VDSL2 transceivers," Recommendation ITU-T G.993.5, Section 9.2, Apr. 2010, International Telecommunication Union, p. 29.

Author Unknown, "Very high speed digital subscriber line transceivers 2 (VDSL2)," Recommendation ITU-T G.993.2, Amendment 3, Section 12.1.4, Aug. 2008, International Telecommunication Union, p. 43.

International Search Report and Written Opinion for PCT/SE2010/050908, mailed Apr. 27, 2011, 14 pages.

International Preliminary Report on Patentability for PCT/SE2010/050908, mailed May 8, 2012, 7 pages.

Ex parte Quayle Action for U.S. Appl. No. 13/581,591 mailed Aug. 28, 2013, 5 pages.

Ex parte Quayle Action for U.S. Appl. No. 14/181,932 mailed May 5, 2014, 8 pages.

Translation of First Office Action and Search Report for Chinese patent application 201080067154.2 issued Feb. 26, 2014, 9 pages.

* cited by examiner

METHOD AND ARRANGEMENT IN A DSL VECTORING SYSTEM

This application is a continuation of U.S. application Ser. No. 14/181,932, filed Feb. 17, 2014, which is a continuation of U.S. application Ser. No. 13/581,591, filed Aug. 28, 2012, now U.S. Pat. No. 8,681,843, which is a 35 U.S.C. 371 national phase filing of International Application No. PCT/SE2010/050908, filed Aug. 23, 2010, which claims the benefit of U.S. Provisional Application No. 61/350,218, filed Jun. 1, 2010, the disclosures of which are incorporated herein by reference in their entireties.

TECHNICAL FIELD

The invention relates to a method and an arrangement in a DSL (Digital Subscriber Line) system, in particular to the handling of Disorderly Shutdown Events (DSE) in a DSL vectoring system.

BACKGROUND

Vectoring technology will be the core technology of the next generation of DSL. It cancels the FEXT (far-end crosstalk) between DSL lines, and therefore maximizes DSL system performance. Vectoring technology will play a very important role in FTTx (Fiber To The Node/Cabinet/Curb/Building/Home/Premises, etc.) business, because it enables offering 100 Mbps per user with DSL lines in the last hundred meters, i.e. between the end of a fiber network and the CPEs (Customer premises Equipments).

ITU-T (Telecommunication Standardization Sector of the International Telecommunication Union) has been standardizing a vectoring standard G.993.5 [1], and the first recommendation of G.993.5 was approved on Apr. 22, 2010. The cancellation of the FEXT is done at the DSLAM (Digital Subscriber Line Access Multiplexer) side. The downstream FEXT is pre-cancelled by a precoder in the DSLAM, while the upstream FEXT is cancelled by an upstream crosstalk canceller in the DSLAM. The recommendation provides a way to estimate the FEXT channel in both downstream and upstream and utilize the estimated channel to cancel the crosstalk.

A Disorderly Shutdown Event (DSE) on a DSL line occurs e.g. when a user unplugs the telephone cable or turns off the CPE abruptly. The disorderly shutdown of a DSL line may change the crosstalk channel characteristics, i.e. the crosstalk coupling to other lines, due to the impedance change at the CPE end which is disorderly shut down. After a DSE, the DSLAM is required, e.g. in VDSL2 (ITU-T G.993.2 [2]), to continue to transmit for about 10 seconds to the CPE which is disorderly shut down, see section 12.1.4 in [2]. The transmission is continued in order to avoid unnecessary retraining of a line at the occurrence of short interruptions of the line. In case the CPE "comes up" again within the 10 seconds, the transmission on the line may continue as before without retraining. Further, a time period of 2.5 seconds should elapse before it is established in the DSLAM that a power down-event has occurred.

However, when using vectoring, the precoder in the DSLAM remains unchanged after a DSE and continues to be optimized for the original channel characteristics, i.e. the channel characteristics before the DSE. This could result in a significant SNR (Signal to Noise Ratio) drop for other lines, since the precoder is outdated and thus cannot completely cancel the crosstalk from the line which is disorderly shut down. It has been reported in [3] that a DSE on one line can make other lines retrain. Retraining a line may take 30 seconds, which is a considerable interruption, e.g. in IP-TV services.

In the current standard G.993.5 [1], it is recommended that "the VTU-O (VDSL Transceiver Unit at the Optical Network Unit) switches off its transmit signal as soon as possible" after the detection of DSE in one line. It is further stated that "Other mechanisms for mitigating the effect of a disorderly shutdown are for further study." Furthermore, it is agreed in ITU-T Huntsville meeting in March 2010 that:

"a disorderly leaving (i.e., CPE disconnect or powerdown) event on a particular line should not cause a retrain on other lines in the same vectored group."

"a disorderly leaving (i.e., CPE disconnect or powerdown) event on a particular line should not cause errored symbol sequences on other fines in the same vectored group that cannot be corrected by a valid INP (Impulse Noise Protection) configuration."

Thus, the recommended solution in the current G.993.5 [1] is in conflict with the VDSL2 recommendation[2], which requires the VTU-O to continue to transmit the downstream signal on the line in question for about 10 seconds after a DSE on a line. Following the recommended solution in G.993.5 [1] may bring problems which are avoided when following the VDSL2 recommendation.

It is identified as a problem that a DSE or disorderly leaving event on a DSL line in a vectored group of DSL lines may cause other lines in the vectored group to retrain when the transmission on said DSL line is continued after the disorderly event. Since it is not desired to terminate the transmission on the line which is subject to a DSE, which would have been a straightforward solution, another solution should be sought.

SUMMARY

It would be desirable to prevent that some of the lines in a vectored group retrain due to the occurrence of a disorderly event in another line in the vectored group, when the transmission on the latter line is continued. It is an object of the invention to enable that the transmission on a line which is subject to a disorderly event may be continued without causing other lines belonging to the same vectored group to retrain. Further, it is an object of the invention to provide a method and an arrangement for fast channel tracking, which may be used e.g. for providing a fast update of a precoding matrix at the occurrence of a disorderly event in a line in a vectored group. These objects may be met by a method and arrangement according to the attached independent claims. Embodiments are defined by the dependent claims.

According to one aspect, a method is provided for handling disorderly events in a DSL system. The method comprises obtaining error samples from CPEs connected to other lines in a vectored group of DSL lines when a disorderly event occurs on a line m in the vectored group of DSL lines, and the transmission on line m is continued after the disorderly event. The method further comprises calculating an estimate of the channel coefficients which have changed due to the disorderly event, based on the error samples. Thus a partial channel estimate is provided. The method further comprises modifying a downstream precoder, at least partly based on the partial channel estimate, such that retraining of the other lines in the vectored group due to the disorderly event is avoided.

According to another aspect, an arrangement is provided, which is adapted to handle disorderly events in a DSL system. The arrangement comprises a detecting unit, which is adapted to detect the occurrence of a disorderly event in a line in a vectored group of DSL lines. The arrangement further comprises an obtaining unit, which is adapted to obtain error samples from CPEs connected to other lines in a vectored group, when a disorderly event is detected in a line m in the vectored group. The arrangement further comprises an estimating unit, which is adapted to calculate an estimate of the channel coefficients which have changed due to the disorderly event, based on the error samples, thus providing a partial channel estimate. The arrangement may further comprise a precoder adapting unit, which is adapted to modify a downstream based on the partial channel estimate, such that retraining of the other lines in the vectored group due to the disorderly event is avoided.

The above method and arrangement may be used for enabling fast channel estimation and precoder update after a disorderly event, e.g. a sudden loss of power, in one line in a vectored group of DSL lines. Such a fast update of the precoder may mitigate the negative effects on the other lines, e.g. SNR drop, caused by the disorderly event.

The above method and arrangement may be implemented in different embodiments. In some embodiments, error samples are obtained, e.g. requested and received, from approximately all other lines than line m in the vector group. In some embodiments, error samples are obtained from a subset of the other channels in the vectored group, where the subset comprises the lines which are most affected by the disorderly event on line m. Using a subset reduces the amount of resources, which are needed for collecting and processing error samples.

Some embodiments may comprise a determining unit, which is adapted to determine whether the effect of the disorderly event motivates the performance of a fast channel estimation and precoder update, or not, based on the obtained error samples. Thus, unnecessary channel estimation and precoder modification can be avoided. Some embodiments may involve a certain time period, within which the samples should be obtained. This time period could be set to be as short as approximately one or two sync symbol periods, but could also be set to a longer period, e.g. 5 or 10 sync symbol periods, or even 1; 2 or 2.5 seconds, if preferred. Such a, e.g. preset, time period would guarantee that a precoder update is performed within a certain time from a disorderly event, and thus before any lines start to retrain.

Further, in some embodiments it may be specified that the partial channel estimate should comprise only the mth column of the channel matrix, or basically only the mth column of the channel matrix.

In some embodiments, only one column of the precoder matrix is updated, at least as a first step. This enables a very fast update.

In some embodiments the precoder may be modified based on a complete estimate of the channel after the disorderly event. Such a complete estimate may comprise a combination of the channel coefficients of the partial channel estimate and coefficients from a complete channel estimate, calculated before the disorderly event.

In some embodiments, an effective channel estimate is derived based on the partial channel estimate. The effective channel estimate may then be used to drive a precoder update algorithm.

According to yet another aspect, a computer program is provided. The computer program comprises computer readable code means, which when run in an arrangement according to any embodiment described herein, will cause the arrangement to perform a procedure according to any of the embodiments described herein.

According to still another aspect, a computer program product is provided. The computer program product comprises the computer program above.

BRIEF DESCRIPTION OF DRAWINGS

The invention will now be described in more detail by means of exemplary embodiments and with reference to the accompanying drawings, in which.

DETAILED DESCRIPTION

Figure 1:
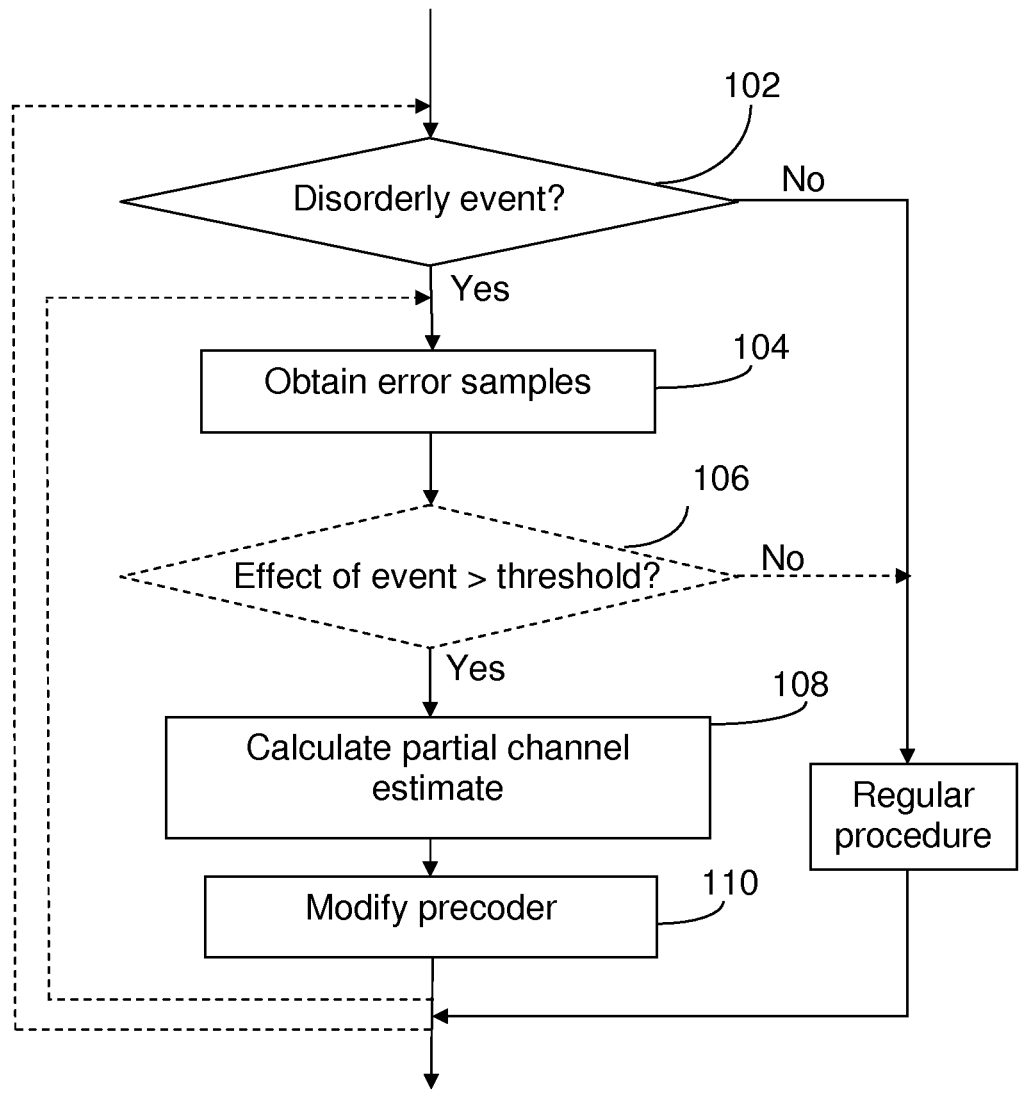
FIG. 1 is a flow chart illustrating procedure steps according to an embodiment.

Briefly described, a solution is provided for enabling a fast update of the precoder for the changed crosstalk channel after e.g. a DSE. A fast channel estimation method is provided to fast track the channel change and quickly update the precoder accordingly. The fast channel estimation, or tracking, method utilizes the fact that it is mainly, or only, the channel coefficients associated with a single line, i.e. the line which is subject to some type of disorderly event, which will have changed.

The term "disorderly event" will henceforth be used as referring to events such as i) disorderly leaving or shutdown events, e.g. CPE disconnect or powerdown, and ii) disorderly "post modification" power-up events, i.e. when the power is back after a precoder modification after a disorderly leaving or shutdown event, and within the e.g. 10 seconds of continued transmission in a line after the disorderly leaving or shutdown event. Disorderly leaving event and Disorderly Shutdown Event (DSE) are used synonymously. A disorderly event could be caused e.g. by a CPE component failure or other malfunction.

Error Sample Request and Feedback Process

When a DSE or other disorderly event is detected on a line, according to an embodiment of the invention, the VTU-Os (the transceiver part for each line in DSLAM) of all, or a subset, of the other lines will send error feedback requests through a robust eoc (embedded operations channel) (ROC) channel [2] to their VTU-Rs (VDSL Transceiver Unit—Remote Terminal, e.g. CPE). The VTU-Rs will provide the requested error samples to the VCE (vectoring control entity) in the vectoring feedback channel, e.g. through the normal eoc channel or the layer 2 channel, depending on different implementation preferences of chipset vendors, specified in [1].

Upon receiving the error samples, the VCE will estimate only the changed channel coefficients, i.e. the channel coefficients associated with the line subject to DSE. The estimate of the changed channel coefficients may thus be performed using only a few error samples received from the VTU-Rs. The rest of the channel coefficients are kept unchanged, e.g.

from a full channel estimate obtained before the DSE. The full, or complete, channel estimate can be approximated as a submatrix of an identity matrix if the precoder was near optimal before the disorderly event, or, it can be the stored knowledge of a previous channel estimate calculated before the disorderly event e.g. if the precoder was not optimal. Then, the VCE uses the updated channel estimate comprising the estimated changed channel coefficients and the "kept" channel coefficients, to drive an adaptive precoder update algorithm, e.g. an LMS algorithm, to update the precoder.

The occurrence of a DSE or other disorderly event may be detected in different ways. For example, a DSE can be easily detected through upstream received power detection, since the upstream transmission will be stopped after a DSE. In reference [1], the DSE detection is done by "detection of far-end loss of power primitive, flpr (see clause 11.3.3.2/G.993.2)".

After the detection of the DSE of one line, the VTU-Os of all, or a subset of, the other lines in the vectoring group may send Error Feedback requests to their VTU-Rs through the ROC channel. After receiving the Error Feedback requests, the VTU-Rs shall send the Error Feedback response as soon as possible back to the VCE in the vectoring feedback channel, e.g. through the normal eoc channel or the layer 2 channel depending on different implementation preferences of chipset vendors specified in [1].

In [1], the Error Feedback requests are sent in the eoc channel, while it is preferred that embodiments of the invention instead use the ROC channel to send the Error Feedback requests. The reason for using the ROC channel instead of the eoc channel is to protect the Error Feedback requests after a DSE, since a DSE on one line could cause numerous errors in downstream transmissions on other lines, due to the mismatch between the precoder and the changed channel. These errors induced by the DSE could corrupt the Error Feedback requests and thus prevent the Error Feedback requests from reaching their destinations.

The feature of transmitting Error Feedback requests over the ROC, instead of over the eoc, should be easy to add to future versions of G.993.5, since the ROC channel is already specified in [2]. The ROC channel supports the use of very conservative bit loading and/or very large Reed-Solomon coding overhead to protect the ROC channel from the errors.

An alternative way to request the VTU-Rs to send Error Feedback responses could be to let the VTU-Os change the sign of the flag tones according to special rules. For example, the sign of the first flag tone of the two flag tones could be kept unchanged, while the sign of the second flag tone may be changed. The VTU-R may then send back an Error Sample response with a default error sample configuration upon the detection of a flag tone sign change. The default error sample configuration could e.g. be negotiated during initialization. After the fast channel tracking process is finished, the sign of the second flag tone may changed back, e.g. to the same sign as the first flag tone.

A possible optional change/improvement in the error sample feedback is to add some side information about bit error statistics, e.g. error counters, in the Error Feedback response from VTU-Rs. This would be helpful e.g. to indicate how fast/urgent the precoder should be updated and how effectively the fast channel tracking works.

Fast Channel Tracking Method

When assuming line m is disorderly shut down, where line m could be any line in the vectoring group, the received signal of the other lines, i.e. the lines in a vectoring group except line m, before the DSE at any tone in downstream can be modeled as (1), using a system model of an N-line vectoring system:

$$y = \overline{Q}H P G x + n \quad (1)$$

where $y=[y_1 \ldots y_{m-1}\ y_{m+1} \ldots y_N]^T$ is an $(N-1)\times 1$ vector representing the received signals of the lines except line m where $y_i$ is the received signal of line i, $x=[x_1\ x_2 \ldots x_N]^T$ is an $N\times 1$ vector representing the transmitted signal vector of all the lines, including line m which causes the crosstalk to the other lines, where $x_i$ is the transmitted signal of line i, $G=\text{diag}([g_1\ g_2 \ldots g_N])$ is an $N\times N$ diagonal matrix representing the gain scaling matrix at the transmitters where $g_i$ is the gain scaling factor of line i that includes all gain scaling, e.g. PSD (Power Spectral Density) mask and fine gain scaling, to the transmitted signal, $\overline{Q}=\text{diag}([q_1 \ldots q_{m-1}\ q_{m+1} \ldots q_N])$ is an $(N-1)\times(N-1)$ diagonal matrix representing the FEQ (frequency domain equalizer) matrix at the receivers where $q_i$ is the FEQ coefficient of line i, $\overline{H}=[h_1\ h_2 \ldots h_N]$ is an $(N-1)\times N$ matrix representing the channel matrix where $h_j=[h_{1j} \ldots h_{(m-1)j}\ h_{(m+1)j} \ldots j_{Nj}]^T$ is the jth column vector of $\overline{H}$ and the element $h_{ij}$ when $i \neq j$ is the crosstalk coefficient from line j to line i while the element $h_{ii}$ is the direct channel coefficient of line i, $P=[p_1\ p_2 \ldots p_N]$ is an $N\times N$ matrix representing the precoding matrix where $p_j=[p_{1j}\ p_{2j} \ldots p_{Nj}]^T$ is the jth column vector of P, and $n=[n_1 \ldots n_{m-1}\ n_{m+1} \ldots n_N]^T$ an $(N-1)\times 1$ vector representing the background noise where $n_i$ is the background noise after the FEQ at CPE i.

In vectoring systems, after vectoring initialization, the precoder is optimally updated to cancel all crosstalks within the vectoring group, such that:

$$\overline{Q}HPG \approx \overline{I} \quad (2)$$

where $\overline{I}$ is an $(N-1)\times N$ a submatrix of an $N\times N$ identity matrix I without the mth row. $\overline{I}$ takes only the rows with the row index from [1 ... m-1 m+1 ... N] of an $N\times N$ identity matrix. An Identity matrix I is a square matrix whose diagonal elements are all 1s, while its off-diagonal elements are all 0s.

With the optimal precoder in (2), the vectoring system approaches the FEXT-free performance as the received signal is $$y \approx x + n \quad (3)$$

where the crosstalk terms are almost completely cancelled. After the DSE of line m, the crosstalk channel from line m to the other lines may change. Therefore, the channel matrix after the DSE can be expressed as $$H_{DSE} = [h_1 \ldots h_{m-1}\ h_m^{DSE}\ h_{m+1} \ldots h_N] \quad (4)$$

Comparing the channel matrix before DSE and after DSE, only the mth column vector is changed.

After the DSE, the precoder is not optimal any more, since the channel has changed. This could cause significant SNR drop on the other lines, which would affect the system performance adversely and even make lines retrain. This could be avoided by quickly updating the precoder according to the channel changes.

All kinds of channel tracking algorithms used to update P, i.e. the precoder, are based on channel estimation in a direct or indirect way.

Reference [1] discloses an easy way to estimate the effective channel $\overline{H} = \overline{Q}HPG$, which can be used to drive a precoder channel tracking algorithm, e.g. an LMS algorithm.

However, a regular channel estimation takes the time of $2^{NEXTPOW2(N)}$ error samples, where error samples are fed back every 64 ms, and where NEXTPOW2(N) is a function which returns the first M such that $2^M \geq N$. For example, for a large vectoring system of 128 lines, the channel estimation would take 64×128=8192 ms, i.e. more than 8 seconds. More than 8 seconds is definitely too slow for updating the precoder after DSE. The "damage" of SNR drops and retraining of neighboring lines would already have taken place within that time.

The precoder should be updated as soon as possible after e.g. a DSE. In order to avoid that the other lines retrain, the precoder update should be much faster than 8 seconds.

In the following, we present a fast channel tracking method, which only requires a few error samples time to do the channel estimation and update the precoder accordingly. The time for the channel estimation is independent of the size of the vectoring group or system concerned.

After the DSE, the effective channel is changed to:

$$\overline{H}_{DSE} = QH_{DSE}PG \quad (5)$$

It is realized, that in order to benefit from that H is known from previous channel estimation before DSE, (5) may be rewritten as:

$$\overline{H}_{DSE} \text{ QHPG} + Q(H_{DsE} - H)PG \quad (6)$$

As the precoder before DSE, P, is optimal for the channel before DSE, H, the effective channel before DSE $\overline{H}$=QHPG≈$\overline{I}$ as shown in (2). Then, (6) can be rewritten as $$\overline{H}_{DSE} \approx \overline{I} + \tilde{H}_{DSE} \quad (7)$$

where "H-tilde"=$\tilde{H}_{DSE}$=Q(H$_{DsE}$-H)PG=Q[0 ... 0 h$_m^{DsE}$-h$_m$ 0 ... 0]PG. In the matrix of (H$_{DSE}$-H), the mth column vector is h$_m^{DSE}$-h$_m$ and the other column vectors are 0 vectors.

Therefore, following (1) with the approximation of (7), the received signal of line i after DSE can be expressed as $$y_i \approx x_i + \sum_{j=1}^{N} q_i(h_{im}^{DSE} - h_{im})p_{mj}g_jx_j + n_i \quad (8)$$

Following (8), it is realized that the error samples of line i can be approximated as $$e_i = y_i - x_i \approx q_i(h_{im}^{DSE} - h_{im})\sum_{j=1}^{N} p_{mj}g_jx_j + n_i \quad (9)$$

where the sum is the signal actually transmitted from the DSLAM to line m, and q is a scaling factor at the CPE to remove the direct channel attenuation and phase shift.

From (9), it becomes possible, even easy, to estimate the changed channel coefficients, as $p_{mj}$, $g_j$, $x_j$ are known to the VCE. It is even possible to estimate the channel from one single error sample, which would at most take 64 ms, possibly plus some minor extra time, from that a disorderly event is detected. Using only one error sample may introduce estimation noise, which could be mitigated by averaging over a few error samples. Such averaging can be used to improve the channel estimation accuracy when necessary.

For example, the effective channel coefficient from line j to line i in $\tilde{H}_{DSE}$ can be estimated as $$\hat{\tilde{h}}_{ij} = \frac{1}{L} \sum_{t=t_0}^{t_0+L-1} \left( \frac{e_i(t)}{\sum_{n=1}^{N} p_{mn}g_nx_n(t)} \right) p_{mj}g_j \quad (10)$$

where q is included in $\tilde{H}_{DSE}$
$e_i(t)$ is the error samples of line i at symbol index of t,
$x_n(t)$ is the tth transmitted symbol of line n,
$t_0$ is the starting sync symbol index of the average block, and
L is the average block size to suppress the noise.

Then, the effective channel after DSE, $\overline{H}_{DSE}$ can be estimated as $$\overline{H}_{DSE} = \overline{I} + \tilde{H}_{DSE} \quad (11)$$

The estimated effective channel coefficients can then be used to update the precoder.

When a previous channel estimation, made before the DSE, is available, an alternative to (10) can be formulated, without using the approximation of $\overline{H} \approx \overline{I}$, as follows:

$$\hat{\tilde{h}}_{ij} = \frac{1}{L} \sum_{t=t_0}^{t_0+L-1} \left( \frac{e_i(t) - \sum_{k=1}^{N} \hat{\tilde{h}}_{ik} x_k(t) + x_i(t)}{\sum_{n=1}^{N} p_{mn}g_nx_n(t)} \right) p_{mj}g_j \quad (12)$$

where $\hat{\tilde{h}}_{ik}$ is the previous estimate of the effective channel coefficient from line k to line i before DSE.

Using (12), the effective channel after DSE, $\overline{H}_{DSE}$, can be estimated as $$\overline{H}_{DSE} = \overline{H} + \hat{\tilde{H}}_{DSE} \quad (13)$$

where $\overline{H}$ is the previous channel estimate of $\overline{H}$ which is the channel before DSE. It should be noted that when a result of a previous channel estimation is to be used, it may be required that the result of the previous channel estimation has been stored in a memory.

A precoder update could be performed in a number of different ways. In principle, the precoder matrix can be considered as the inverse of the channel matrix. Thus, the whole precoder will be changed, even when only one column of the channel matrix is changed after a disorderly event. However, the major change in the precoder will be in one column, when only one column of the channel matrix is changed, because the DSL channel is diagonal-dominant where the direct channel coefficients are much larger than the crosstalk coefficients.

It should be noted that the precoder may be partially updated, e.g. by updating only the mth column vector in P, based on the estimated channel coefficients. This would be suboptimal, but would still enable preventing retraining of lines as a consequence of a disorderly event in another line. Such a partial update may work well, since the DSL channel is diagonal-dominant. Further, such a partial update of the precoder, e.g. as a first step after a disorderly event, could in some cases accelerate the convergence of the precoder updating algorithm. There are several ways to utilize a channel estimate for updating a precoder, e.g. based on zero-forcing, LMS (Least Mean Square) or RLS (Recursive Least Square).

In the example above, $\overline{H}$ is estimated. However, it would also be possible to estimate e.g. QH, instead of $\overline{H}$. One advantage of estimating H̄ instead of QH is that the calculation of P$^{-1}$ is avoided. Calculating P$^{-1}$ may be costly in terms of computational complexity and thus time, since P$^{-1}$ is not a diagonal matrix. Calculating G$^{-1}$, which would also be needed when estimating QH, would on the other hand not be problematic, since G is a diagonal matrix.

It is further realized that a disorderly event, such as a DSE, may affect different lines differently. Typically, the lines experiencing the strongest crosstalk from the line subjected to e.g. a DSE, prior to the DSE, are more affected by the DSE than other lines. The reason for this is that these "strong crosstalk"-lines have a relatively strong coupling to the line subjected to a DSE. The most affected lines can be determined, e.g. from the crosstalk channel estimate before the DSE. Furthermore, a list of the most affected lines could also be obtained from historic information in the network management system. For example, information related to previously performed line retrainings due to DSEs can be collected, in order to determine which lines that are the most affected lines.

When a list of the most affected lines is available, it is possible, and may be preferred, to collect only the error samples of the most affected lines. Then, error sample requests may be sent only to a predetermined subset of the other lines in the vectored group, where the subset comprises the most affected lines. For example, the subset could be set to comprise the lines which were subjected to crosstalk stronger than a certain threshold, prior to the disorderly event, from the line subjected to a disorderly event. When using only the error samples of the most affected lines, only the channel coefficients related to the most affected lines will be estimated. Accordingly, the precoder may be partially updated for the most affected lines. Using error samples only from the most affected lines will save, e.g. computational and transmission resources.

Some Further Aspects

In a broad aspect of the invention, at least one error sample $e_i$ is obtained from a line i, and the quotient between the error sample and the signal transmitted to line m is used as an indication of the change in crosstalk properties from line m to line i to update the precoder, where line m was subject to a disorderly event, as described in e.g. eq. (10) and the text following it.

The transmitted signal may be calculated as:

$$\sum_{n=1}^{N} p_{mn} g_n x_n(t)$$

In an alternative, the transmitted signal may be approximated and calculated as $p_{mm} g_m xm(t)$, thus neglecting the crosstalk cancellation components of the transmitted signal.

The quotient may be subject to noise reduction, such as averaging it with quotients based on further error samples from the same line, e.g. as in eq. (10).

The error samples can be used without any decoupling process to eliminate contributions to the error from other lines in the vectoring group than line m. Hence, fewer than $2^{NEXT\_POW2(N)}$ error samples for a line i may be used to update the precoder, where N is the number of lines in the vectoring group. Fewer than N samples may also be used.

Indeed, if very quick updating is desired, as few as one single sample may be used, which makes it possible to update the precoder very quickly. 2, 3, 4 or 5 samples are other alternatives which provide different balances of update time versus SNR drop.

Since the method does not need a lot of error samples, the needed samples may be retrieved, and the precoder updated, within a time which is short enough such that there will be no retrain on lines, which are subjected to elevated crosstalk as a result of the disorderly event.

The methods of the invention may also be used for the case when one line joins the vectoring group in an orderly fashion, as well as for any event (disorderly or not) where there are changes of the crosstalk properties concerning a single line only, (e.g. the crosstalk properties between that line and other lines, but not between the other lines).

A further aspect of the invention is that a DSL CPE may be adapted to respond to a request for an error sample received in an ROC channel. This reliably enables fast DSLAM precoder updating according to the invention. Alternatively, a CPE may be adapted to respond by sending an error sample upon detection of a flag tone sign change.

Further, some embodiments of the invention may be described as follows:

In the case of detection of the Near-end defect loss of signal (los), see clause 11.3.1.3/G.993.2, it is recommended that the VTU-O switches off its transmit signal as soon as possible. Another option is as soon as los is detected to request error samples using the robust eoc channel and use a precoder fast update mechanism, as follows:

When a DSE or other disorderly event is detected on a line, the VTU-Os of the other lines may send error feedback requests using robust eoc channel to their VTU-Rs. The VTU-Rs may provide the requested error samples to the VCE in the vectoring feedback channel. Upon receiving the error samples, by estimating only the changed channel coefficients, i.e. the channel coefficients associated with the line subject to DSE, it is possible to estimate the full channel. This can be performed using only a few error samples received from the VTU-Rs. Then, the VCE may use the updated channel estimate comprising the estimated changed channel coefficients and the unchanged channel coefficients to update the precoder. Using just a few error samples will enable a fast update of the precoder, thus avoiding that the other lines retrain due to the DSE.

Example Procedure, FIG. 1

An exemplary procedure of fast channel tracking or precoder channel tracking performed in a VCE could be described as follows, with reference to FIG. 1. Initially, a disorderly event is detected in a step 102. The disorderly event could be detected e.g. by monitoring a flag, which changes sign when there is a significant power change in a line, e.g. on/off. When a disorderly event in a line is detected in a line m, error samples from the CPE-side of the lines, or a subset of the lines, are obtained in a next step 104. The error samples could be obtained by that the VTU-Os of the lines send error feedback requests through a ROC channel to their VTU-Rs. If it is a power-down-event, no request need be sent on line m, for natural reasons. The VTU-Rs will then provide the requested error samples to the VCE (vectoring control entity) in the vectoring feedback channel.

By analyzing the received error samples, it could then in an optional step 106, surrounded by a dashed line, be determined whether a precoder update is required or not, e.g. by comparing the error samples to a predetermined error threshold, or based on the bit error related information provided by the error sample report. When the desired amount of error samples is obtained, a partial channel estimate is calculated in a step 108 based on the received error samples. The partial channel estimate comprises the channel coefficients which have changed as a consequence of the disorderly event, i.e. the column vector m of the channel matrix. The partial channel estimate is then used in a next step 110 to modify the downstream precoder, such that retraining of the other lines, i.e. other than m, in the vectored group due to the DSE is avoided.

The precoder update could be performed in a number of different ways. One option is to produce a complete channel estimate e.g. by combining the partial estimate from step 108 with re-used "non-changed" coefficients from a complete channel estimate calculated before the disorderly event. The combined channel estimate may then be used to drive an adaptive precoder update algorithm. It is also possible to update the precoder using only the partial channel estimate, e.g. updating only one column of the precoder. This would be suboptimal, but may still provide a result which prevents retraining of lines as a consequence of a disorderly event in another line. The precoder could be iteratively modified e.g. until the result of the modifications has converged to a desired level (e.g. as denoted by the inner dashed line from just after step 110 to just before step 104).

When updating is complete the VCE may await further events (outer dashed line from just after step 110 to just before step 102)

Figure 2:
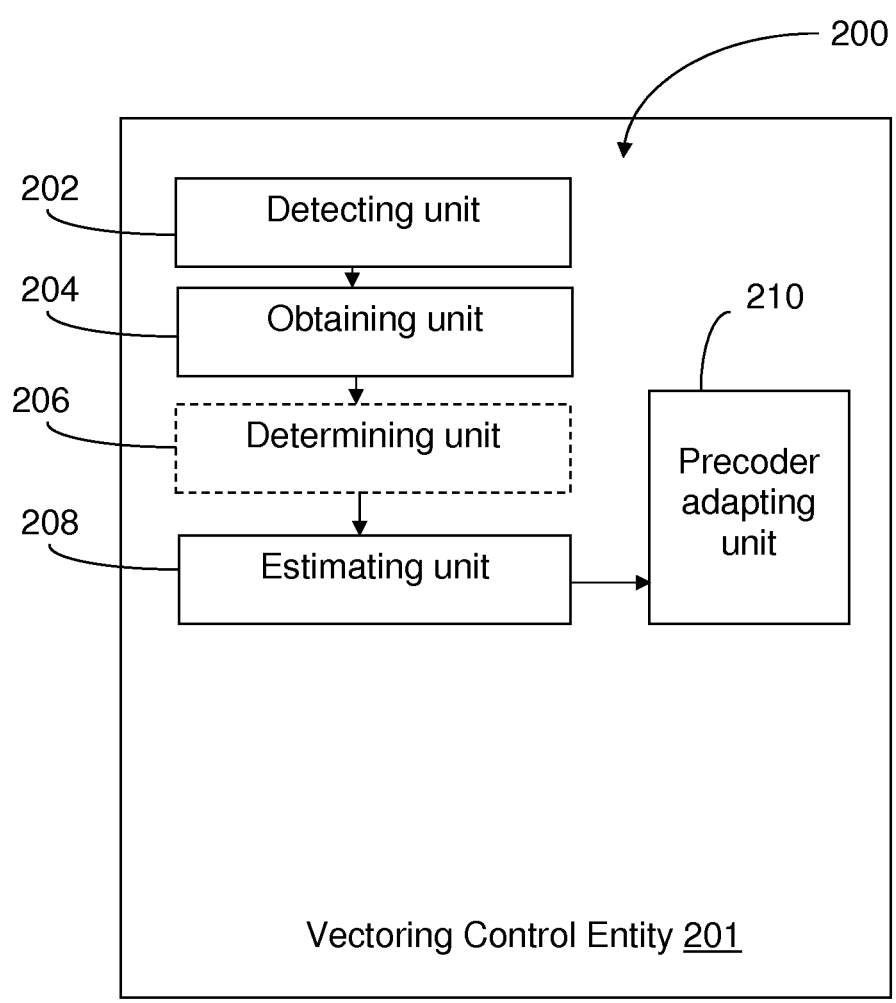
FIG. 2 is a block scheme illustrating an arrangement, according to an embodiment.

Exemplary Embodiment, FIG. 2

Below, an exemplary arrangement 200 in a VCE 201, adapted to enable the performance of the above described procedure, will be described with reference to FIG. 2. The arrangement 200 may comprise a detecting unit 202, which is adapted to detect the occurrence of a disorderly event in any of the lines in a vectored group of DSL lines. The arrangement 200 further comprises an obtaining unit 204, which is adapted to obtain error samples from the CPEs connected to the other lines, or a subset of the other lines, in a vectored group of DSL lines, when a disorderly event is detected in a line m in the vectored group.

The arrangement 200 may further comprise a determining unit 206, surrounded by a dashed line, which may be adapted to determine if the effect of the disorderly event on the lines in the vectored group is significant enough to require a precoder modification, e.g. by comparing the error samples to an error threshold or based on the bit error related information provided by the error sample report. The arrangement 200 further comprises an estimating unit 208, which is adapted to calculate an estimate of the channel coefficients which changed due to the disorderly event, and thus provide a partial channel estimate. The estimating unit 208 is adapted to calculate the partial estimate based on the obtained error samples. The arrangement 200 further comprises a precoder adapting unit 210, which is adapted to modify a downstream precoder, at least partly based on the partial channel estimate, such that retraining of the other lines in the vectored group due to the disorderly event is avoided.

It should be noted that FIG. 2 merely illustrates various functional units of the arrangement 200 in a logical sense. The functional units could also be denoted e.g. "modules" or "circuits", or be parts of circuits. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). Thus, the invention is generally not limited to the shown structure of the arrangement 200.

Simulation Setup

To show the performance of an embodiment of the invention, a simulation is done. The following lists the simulation setup:

PSD profile: 17a
Six-line vectoring system
Line 1 is disorderly shutdown.
Measured channel of a 500 meter 0.5 mm cable. The channel after DSE is measured with the CPE side of line 1 open-circuited.
Background noise: −130 dBm/Hz.
Vectoring pilot sequence length: 8.
Subsampling factor of error samples: 2.

Simulation Results

Figure 3:
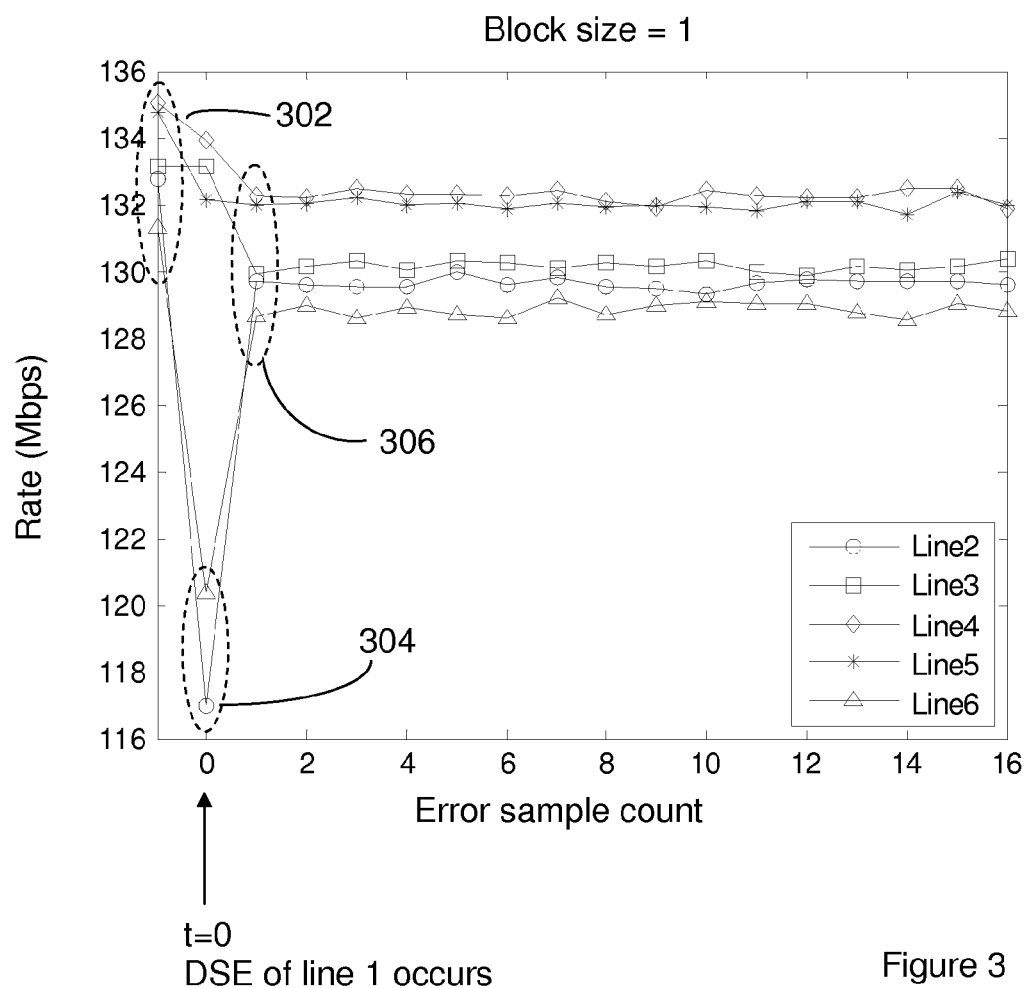
FIGS. 3-4 are diagrams illustrating the bit rates of the other lines after a DSE on one line in a vectored group, when applying an embodiment of the invention.
Figure 4:
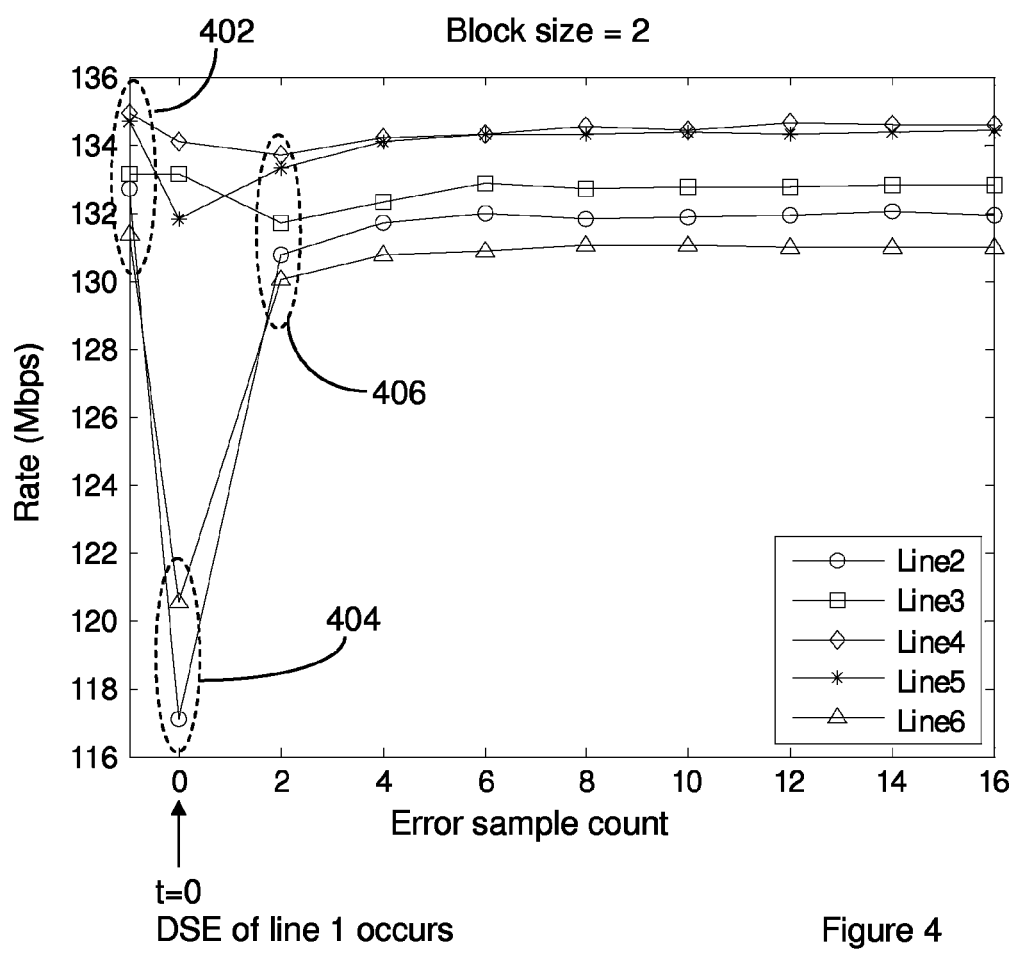

FIG. 3 and FIG. 4 show the bit rates of the other lines before and after the DSE of line 1 with fast channel tracking using block size of 1 and 2 error samples, respectively. In this simulation setup, it is mainly the bit rates of lines 2 and 6, 304, 404, which are affected by the DSE of line 1. It can be seen in FIG. 3 that the fast channel tracking can recover the bit rates, 306, to close to the original bit rates before DSE, 302, even with a block size of only 1 error sample, i.e. within approximately 64 ms. In FIG. 4 it can be seen that the bit rates, 406, of the other lines can be improved to almost the original bit rates, 402, with a block size of 2 error samples.

Figure 5:
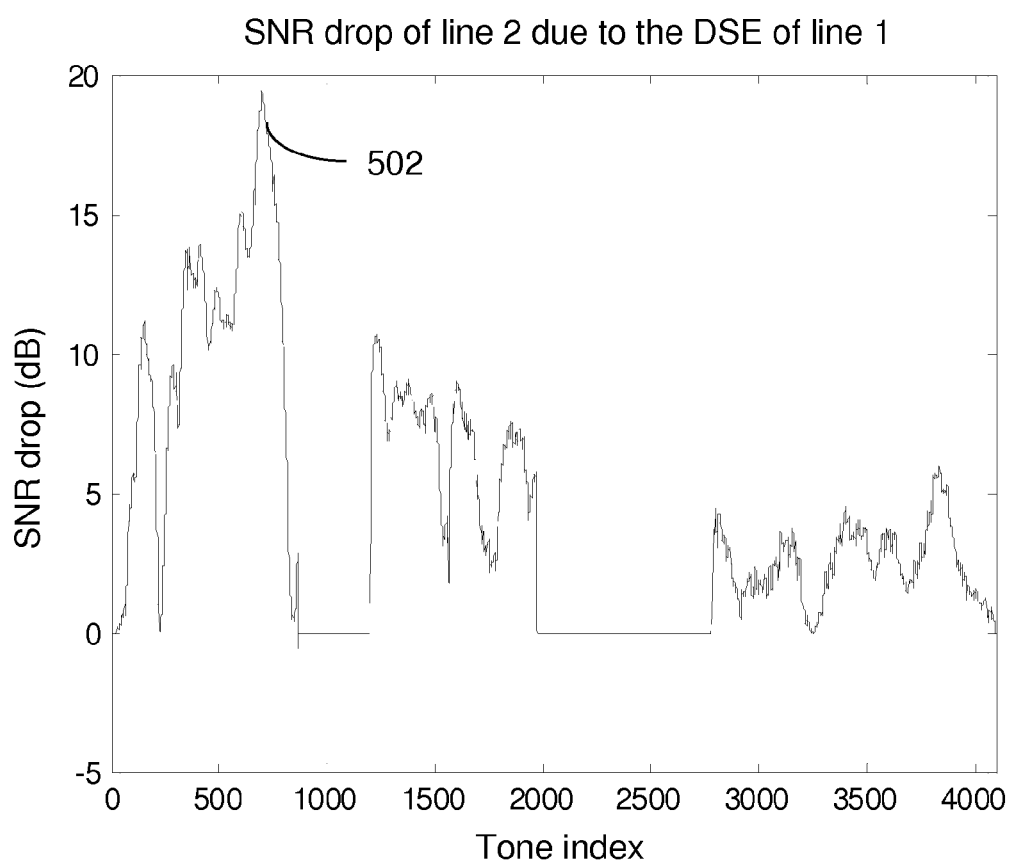
FIG. 5 is a diagram illustrating the SNR drop of a line, caused by a DSE on another line in the same vectored group, as compared to the SNR before DSE.

FIG. 5 shows the SNR drop for line 2 after the DSE as compared to the SNR before DSE. It shows the SNR of line 2 is substantially reduced after the DSE, which may cause a retraining of line 2. The SNR drop of line 2 has a peak, 502, of up to approximately 20 dB around tone index 700. Line 2 may retrain in this scenario, as the SNR margin, which is normally 6 dB, is not large enough to compensate for such an SNR reduction.

Figure 6:
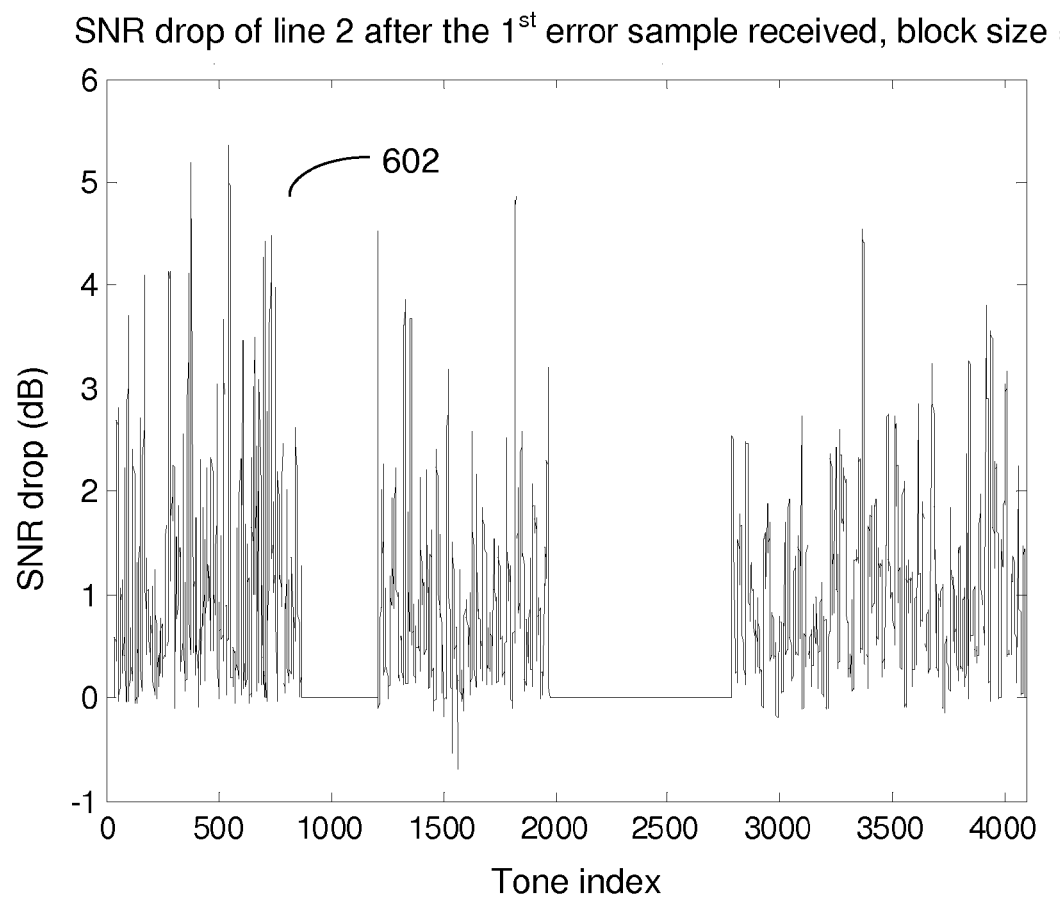
FIGS. 6-7 are diagrams illustrating the SNR drop of a line after a DSE on another line in the same vectored group, as compared to the SNR before DSE, when applying an embodiment of the invention.
Figure 7:
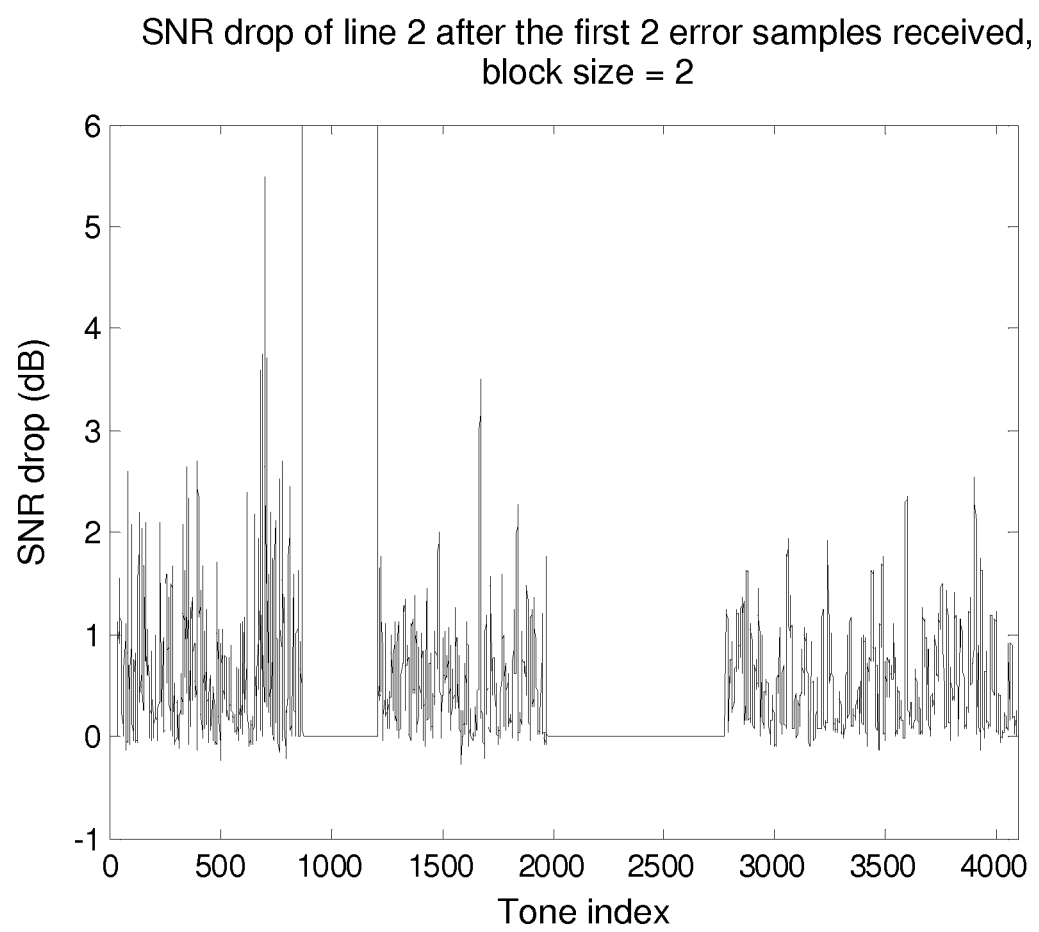

FIG. 6 and FIG. 7 show the SNR drop of line 2 after the 1st block of fast channel tracking comparing to the SNR before DSE, with block size of 1 and 2, respectively. When the block size=1 error sample, which is illustrated in FIG. 6, the SNR reduction of a majority of the tones is reduced to about 3-4 dB already after the 1st error sample received. When the block size=2, which is illustrated in FIG. 7, the SNR reduction of a majority of the tones is mitigated to about 1-2 dB after the first 2 error samples received. This means that the lines are protected from retrain already after the 1st block, since the remaining SNR drop after the first block is well below the SNR margin.

Time Required for Precoder Update

In a worst case scenario, the time from DSE until the required amount of error samples has been received is (block size)*(sync symbol period or error sample period). The error sample feedback time is very short, and could thus be approximated to zero. The time required in the worst case, with block size=1 would then be (block size)*(sync symbol period)=1*64 ms=64 ms. In the case with block size=2, the worst case would be 2*64 ms=128 ms. This is also approximately the time required to update the precoder to the new channel conditions. Depending on the block size, the precoder result after the first update may be further improved by performing further precoder updates using more error samples.

In comparison, when using conventional methods, the time from a DSE until a precoder update would depend on the number of lines in the vectoring group. For example, it would take more than 8 seconds to update the precoder in a vectoring system comprising 128 lines, as previously mentioned.

Figure 8:
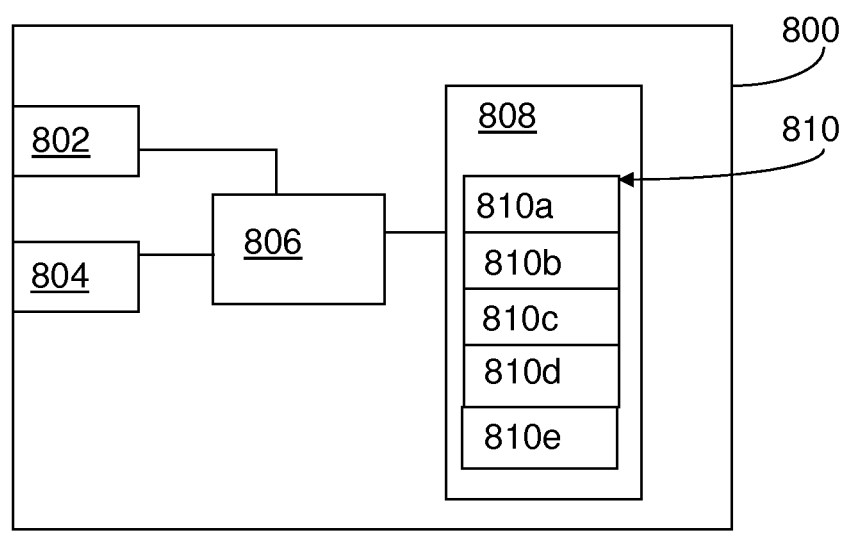
FIG. 8 is a schematic view illustrating an arrangement, according to an embodiment.

Exemplary Embodiment, FIG. 8

FIG. 8 schematically shows an embodiment of an arrangement 800 in a Vectoring Control Entity, which also can be an alternative way of disclosing an embodiment of the arrangement in a Vectoring Control Entity illustrated in FIG. 2. Comprised in the arrangement 800 are here a processing unit 806, e.g. with a DSP (Digital Signal Processor) and an encoding and a decoding module. The processing unit 806 can be a single unit or a plurality of units to perform different steps of procedures described herein. The arrangement 800 also comprises the input unit 802 for receiving signals, such as information on the lines in a vectoring group, and the output unit 804 for output signal(s), such as, e.g. precoder update information. The input unit 802 and the output unit 804 may be arranged as one in the hardware of the arrangement.

Furthermore the arrangement 800 comprises at least one computer program product 808 in the form of a non-volatile memory, e.g. an EEPROM (Electrically Erasable Programmable Read-Only Memory), a flash memory and a disk drive. The computer program product 808 comprises a computer program 810, which comprises code means, which when run in the processing unit 806 in the arrangement 800 causes the arrangement and/or the VCE to perform the steps of the procedure described earlier in conjunction with FIG. 1.

Hence in the exemplary embodiments described, the code means in the computer program 810 of the arrangement 800 comprises a detecting module 810a for detecting whether a disorderly event has occurred in a line in a vectored group of DSL lines. The computer program may further comprise an obtaining module 810b for obtaining error samples from all or a subset of the CPEs connected to the other lines in the vectored group, when a disorderly event is detected in a line m in the vectored group. The computer program may further comprise a determining module 810c determining whether a fast precoder update should be performed or not based on the obtained error samples. The computer program could further comprise an estimating module 810d calculating an estimate of the channel coefficients changed due to the disorderly event, based on the obtained error samples, thus providing a partial channel estimate. The computer program could further comprise precoder adapting module 810e modifying a downstream precoder, at least partly based on the partial channel estimate, such that retraining of the other lines in the vectored group due to the disorderly event is avoided. The computer program 810 is in the form of computer program code structured in computer program modules. The modules 810a-e essentially perform the steps of the flows illustrated in FIG. 1 to emulate the arrangement in VCE illustrated in FIG. 2. In other words, when the different modules 810a-e are run on the processing unit 806, they correspond to the units 202-210 of FIG. 2.

Although the code means in the embodiment disclosed above in conjunction with FIG. 8 are implemented as computer program modules which when run on the processing unit causes the arrangement and/or VCE to perform the steps described above in the conjunction with figures mentioned above, at least one of the code means may in alternative embodiments be implemented at least partly as hardware circuits.

Some Remarks

One general advantage of the invention is that it enables avoiding immediately switching off the transmit signal on the line, which is subject to a disorderly event, and thus enables continued transmission compliant with VDSL2 recommendation [2]. Further, the invention enables that a precoder is updated so fast that retrains of the other lines are avoided. With the block size of 1 error sample, the time during which other lines in the same vectoring group are significantly affected by a disorderly event in a line may be reduced to ≤64 ms. Further, this is achieved in a way which only requires minor changes of existing standards.

The invention can be easily modified for other applications where only one column vector in the channel matrix is changed, and the upstream crosstalk canceller and/or the downstream precoder is approximately optimal before the channel changes, or, when the upstream crosstalk canceller and/or the downstream precoder is not optimal, but the knowledge of the previous channel estimation is available, and it thus is possible to compensate for the non-optimal crosstalk canceller and/or downstream precoder.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference.

Abbreviations
- CPE Customer Premises Equipment
- DSE Disorderly Shutdown Event
- DSL Digital Subscriber Line
- DSLAM Digital Subscriber Line Access Multiplexer
- ROC Robust embedded Operations Channel
- VCE Vectoring Control Entity
- VTU-O VDSL Transceiver Unit at the Optical Network Unit
- VTU-R VDSL Transceiver Unit-Remote Terminal

REFERENCES

[1] Draft Recommendation ITU-T G.993.5 Self-FEXT Cancellation (Vectoring) for use with VDSL2 transceivers
[2] Recommendation ITU-T G.993.2 Very High Speed Digital Subscriber Line Transceivers 2 (VDSL2) Amendment 3
[3] Alcatel-Lucent, "G.vector: Retrains due to Disorderly Leaving Events", ITU-T SG15/Q4 contribution 10HA-020, Huntsville, Ala., March 2010.

The invention claimed is:

1. A method of operation by a Vectoring Control Entity, VCE, for handling disorderly events in a Digital Subscriber Line, DSL, system, the method comprising:
   obtaining error samples from remote terminals connected to lines in a vectored group of DSL lines;
   calculating an estimate of channel coefficients that have changed due to a disorderly event, based on the error samples; and
   updating a precoder based on the estimated channel coefficients.

2. The method of claim 1, wherein the disorderly event occurs on a line of the vectored group of DSL lines other than the lines for which the error samples are obtained.

3. The method of claim 2, wherein the channel coefficients that have changed are related to the line subjected to the disorderly event.

4. The method of claim 2, wherein a transmission on the line subjected to the disorderly event continues after the disorderly event occurs.

5. The method of claim 1, wherein the error samples are obtained after the disorderly event is detected by the VCE.

6. The method of claim 1, wherein the remote terminals comprise Very High Speed Digital Subscriber Line, VDSL, Transceiver Unit-Remote Terminals, VTU-Rs.

7. The method of claim 6, wherein the error samples are provided by the VTU-Rs in response to feedback requests sent from respective VDSL Transceiver Unit-Remote at Optical Network Units, VTU-Os.

8. The method of claim 7, wherein the feedback requests are sent to the VTU-Rs via a Robust Embedded Operations Channel, ROC.

9. The method of claim 6, wherein the VTU-Rs comprise Customer Premises Equipments, CPEs.

10. The method of claim 1, wherein the precoder comprises a matrix of values related to channel coefficients for the vectored group of DSL lines.

11. A Vectoring Control Entity, VCE, adapted to handle disorderly events in a Digital Subscriber Line, DSL, system, comprising:
   at least one processor; and
   memory containing software executable by the at least one processor to cause the VCE to:
      obtain error samples from remote terminals connected to lines in a vectored group of DSL lines;
      calculate an estimate of channel coefficients that have changed due to a disorderly event, based on the error samples; and
      update a precoder by using the estimated channel coefficients.

* * * * *